United States Patent [19]

Beam, Jr. et al.

[11] 4,059,972
[45] Nov. 29, 1977

[54] TURBINE SHAFT BALANCING

[75] Inventors: Paul E. Beam, Jr., Indianapolis; Charles K. Meyers, Danville, both of Ind.

[73] Assignee: General Motors Corporation, Detroit, Mich.

[21] Appl. No.: 667,629

[22] Filed: Mar. 17, 1976

Related U.S. Application Data

[62] Division of Ser. No. 490,907, July 22, 1974, Pat. No. 3,964,342.

[51] Int. Cl.² ............................................. F16C 1/00
[52] U.S. Cl. .................................... 64/1 V; 74/573 R
[58] Field of Search ................... 64/1 V; 74/573, 574; 415/104

[56] References Cited

U.S. PATENT DOCUMENTS

| | | | |
|---|---|---|---|
| 1,664,713 | 4/1928 | Strickland | 64/1 V |
| 1,776,125 | 9/1930 | Linn | 74/573 |
| 2,522,958 | 9/1950 | Palmer | 74/573 |
| 2,809,503 | 10/1957 | Gaubatz et al. | 64/1 V |

Primary Examiner—Samuel Scott
Assistant Examiner—Randall Heald
Attorney, Agent, or Firm—J. C. Evans

[57] ABSTRACT

A multi-shaft gas turbine has an inner shaft rotatably supported at opposite ends thereof with one end adapted to be connected to a load and the other end to a turbine wheel with a tubular section that receives a balance tube removably mounted within the shaft and accessible from the aft end of the engine by removal of an inner exhaust cone and a bearing pump cover. The balance tube includes front, rear and intermediate circumferentially arranged splined lands that bear balance weights angularly positioned on the tube prior to insertion thereof into the shaft, each of the weights having a peripheral surface thereon for locating the longitudinal axis of the balance tube colinearly of the longitudinal axis of the inner shaft.

2 Claims, 5 Drawing Figures

TURBINE SHAFT BALANCING

The invention herein described was made in the course of work under a contract or subcontract thereunder with the Department of Defense.

This application is a division of Ser. No. 490,907, filed July 22, 1974, now U.S. Pat. No. 3,964,342 issued June 22, 1976.

This invention relates to rotary power shaft assemblies and more particularly to balance weight assemblies therein for dynamically balancing the rotary shaft assembly in multiple planes during its operation.

In certain free turbine shaft engines of the multiple shaft type where an inner shaft is coupled at one end to a load and at the opposite end to a turbine wheel, it is desirable to operate the engine shaft at a super critical speed, a speed above that at which the number of revolutions per second of the shaft is equal to the frequency of the natural vibrations of the shaft.

In order to obtain multi-plane balance of such a shaft arrangement, it is necessary to precisely balance the shaft. To accomplish this, the shaft must be balanced in the engine.

One object of the present invention is to provide an easily adjusted shaft balance assembly adjustable in several planes to obtain precise balance for speeds of operation in the super critical range by the provision of a drive assembly having a tubular shaft that receives a balance tube therein removable from an aft opening and wherein the balance tube includes a plurality of axially spaced balance weights thereon interconnected to the balance tube for angular adjustment thereon when the balance tube is removed from the shaft and wherein each of the balance weights centers the balance tube in the drive shaft to be colinear of the longitudinal axis thereof and wherein balancing can be precisely obtained without the requirement for special tooling or machining away of any parts of the mass of the rotary assembly.

Still another object of the present invention is to provide an improved multi-shaft gas turbine having a free inner turbine shaft with a first rotatably supporting end adapted to be connected to a load and an opposite end thereon defined in part by a tubular portion connected to a turbine wheel having an access opening therein at the aft of the turbine engine and wherein a balance tube is mounted within the tubular portion of the inner shaft having axially spaced balance weights thereon secured to the shaft in adjusted angular relationship with respect thereto with the balance tube and weights thereon being removable from the inner shaft through the aft end of the turbine engine for adjusting the weights angularly on the shaft with the weights serving to center the balance tube within the tubular portion so as to maintain the longitudinal axis thereof colinearly of the longitudinal axis of the shaft and with the weights serving to produce a multi-plane balance of the inner shaft for operation thereof at a speed equal to the frequency of its natural vibrations and to do so by an arrangement that enables the balance tube to be located in the inner shaft without the need for special tools and wherein balancing can be obtained without the machining away of any parts of the rotary assembly.

Still another object of the present invention is to provide an improved shaft assembly for a helicopter engine including an inner free turbine shaft having one end thereof supported by bearing means at the front of the engine and having a tubular portion at the opposite end thereof connected to a rotor wheel having an access port therethrough from the aft of the engine into the tubular portion of the shaft and wherein bearing means are provided aft of the engine for rotatably supporting the wheel and the tubular portion of the shaft, the assembly having a balance tube removably inserted within the tubular portion of the inner shaft and carrying front, rear and intermediate balance weights thereon each splined to the balance tube for arcuate adjustment with respect thereto, one end of the balance tube including a radially outwardly directed connector flange secured to the rotor wheel hub by a spanner nut against axial movement within said tubular portion and being removable through the aft of the engine for adjusting the weights on the balance tube to precisely balance the free shaft to balance speeds of rotation thereof equal to the frequency of vibration of the shaft and wherein each of the balance weights include a peripheral outer surface thereon seated against index surfaces on the interior of the shaft for locating the longitudinal axis of the balance tube colinearly of the longitudinal axis of the shaft.

Further objects and advantages of the present invention will be apparent from the following description, reference being had to the accompanying drawings in which a preferred embodiment of the present invention is clearly shown.

In the Drawings

Figure 1:
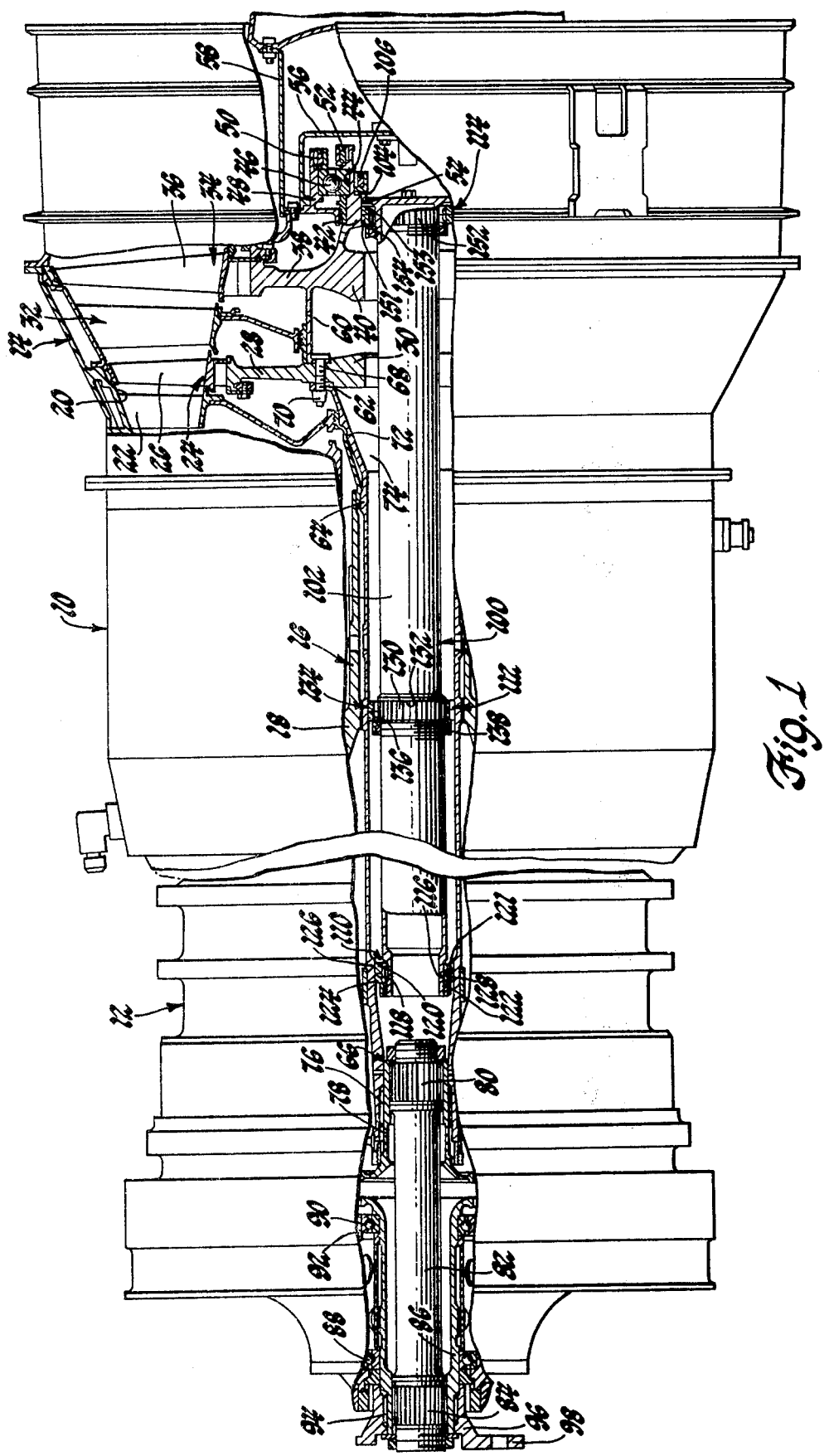
FIG. 1 is a longitudinal view of a free turbine shaft with balance tube.
Figure 2:
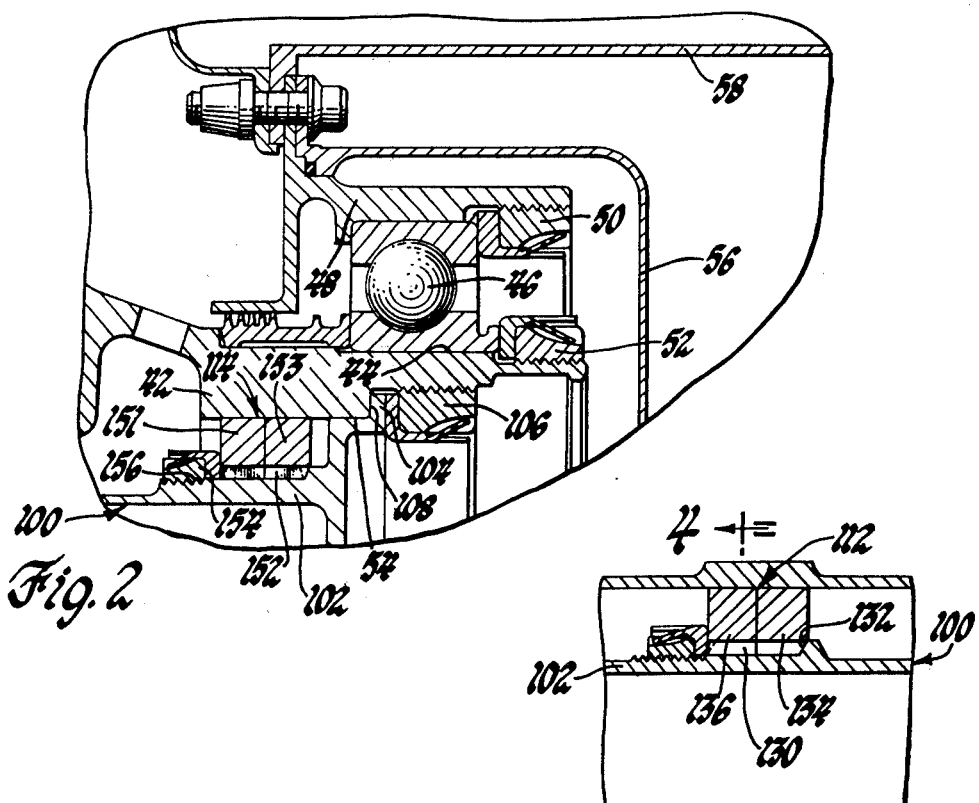
FIG. 2 is an enlarged sectional view of a rear bearing in FIG. 1.

Referring now to FIG. 1, a gas turbine engine 10 is illustrated including a multi-stage compressor section 12 at the front of the engine and a multi-stage turbine section 14 at the rear of the engine.

The illustrated engine 10 is characterized by an operating mode where a load drive shaft is operated above the speed at which the number of revolutions per second of the shaft is equal to the frequency of its natural vibration.

Under this mode of operation, it is necessary to precisely balance the power shaft.

More particularly, in the illustrated arrangement, the engine includes a multiple shaft configuration 16 including a radially outwardly located compressor shaft 18 having one end thereof connected to turbine stages (not shown) for operating the compressor in section 12. Compressed air from the section 12 is directed through a combustor assembly of a conventional type along with fuel to produce motive fluid combustor gases passing through a turbine diffuser passage 20 including a turbine nozzle 22 having a ring of vanes thereon for directing combustor gas across a first turbine stage 24 including a ring of turbine blades 26 connected to a turbine wheel 28 having a radially inwardly located hub 30 thereon. The turbine further includes a second nozzle 32 located downstream of the turbine stage 24 for directing gas across a second downstream turbine stage 34 including a ring of turbine blades 36 connected to a turbine wheel 38 having a radially inwardly located hub portion 40 thereon with a rearwardly directed axial extension 42. The extension 42 includes a radially outwardly located bearing surface 44 thereon which is supportingly received by an annular roller bearing 46 supportingly received in a bearing ring 48. The outer race of the bearing 46 is secured within the ring by a spanner nut 50 and the inner race is secured therein by means of a spanner nut 52.

The axial extension 42 further includes a centrally located bore 54 therethrough defining an access opening from the aft end of the engine when a bearing sump cover 56 and an inner exhaust cone 58 are removed from the engine.

The turbine stages 24, 34 are coupled together by a flange 60 and the turbine stage 24 has its hub 30 connected to an annular flange 62 on one end of a tubular portion 64 of a free turbine shaft 66 by means of a ring of circumferentially spaced bolts 68 and lock nuts 70. The flange 62 is connected to the tubular portion 64 by a radially inwardly converging portion 72 to define an access opening 74 to the interior of the portion 64 at the aft end thereof.

In the illustrated arrangement, the shaft portion 64 includes a spline connection 76 at the fore end thereof connected to an adaptor 78 which is in turn connected by a spline connection 80 to an output shaft 82 having its opposite end connected by a spline connection 84 to a cantilevered bearing member 86 which is telescoped over the output shaft 82 to extend axially thereof from the front of the engine rearwardly thereof. The cantilevered bearing member 86 is supported by a pair of axially spaced ball bearings 88, 90 with respect to a forward bulkhead 92 of the engine 10. Thus, the free turbine shaft 66 is rotatably supported at the front of the engine by bearings 88, 90 and at the rear of the engine by the ball bearing 46 so as to define a longitudinal drive axis through the engine 10 between the multi-stage turbine section 14 thereof and the multi-stage compressor section 12 thereof. The cantilevered bearing member 86 is connected by means of a spline connection 94 to a hub 96 of a radially outwardly flanged member 98 that is adapted to be connected to an external load driven by the turbine stages 24, 34 through the free turbine shaft 66.

In certain applications, it is desirable to operate turbines of the aforesaid type at a super critical speed wherein the free turbine shaft 66 is operated at those speeds at which the number of revolutions per second of the shaft 66 exceeds the frequency of its natural vibration.

Computer programs are available to provide information to precisely balance shafts in this operating mode through multi-planes. In order to effect precise multi-plane balancing in accordance with the computer program, it is necessary to balance the shaft 66 in-situ during such operation.

According to the present invention, such balancing is obtained by means of a balance tube assembly 100 that is easily located for rotation with the free turbine shaft 66 and removable therefrom to obtain redistribution of balance weight to accomplish the intended purpose of precise multi-plane balancing under super critical modes of operation.

More particularly, the balance tube assembly 100 includes an elongated balance tube 102 that is insertable through the access openings 54, 74 from the aft of the engine when the bearing sump cover 56 and inner exhaust cone 58 are removed therefrom. The balance tube 102 has a radially outwardly located flange 104 on the aft end thereof that is connected to the bearing hub extension 42 by means of an annular spanner nut 106 threadably received on the extension 42 and adjustable with respect thereto against the periphery of the tube flange 104. The tube flange 104 is axially seated against an annular shoulder 108 on the extension 42 to fix it axially with respect to the free turbine shaft 66.

Balance assembly 100 further includes three separate balance weight components including a forwardly located balance weight subassembly 110, an intermediate balance weight subassembly 112 and a rear balance weight subassembly 114. The subassembly 110 includes a splined circumferentially formed index land surface 116 thereon that slidably supports a pair of balance weights 118, 120 each retained on the indexing spline surface 116 by means of a tube shoulder 121 and a spanner nut 122 on an externally threaded inboard end of tube 102. The outer peripheries 124, 126 of each of the balance weights 118, 120 are supportingly received on a reduced I.D. surface 128 at the front end of the tubular extension 64 of the free turbine shaft 66 for locating the inboard end of the balance tube 102 centrally within the tubular extension 64.

Figure 3:
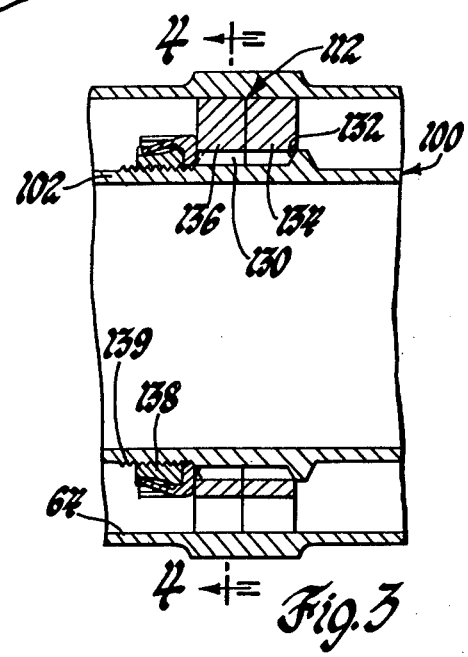
FIG. 3 is an enlarged sectional view of a balance weight in FIG. 1.
Figure 4:
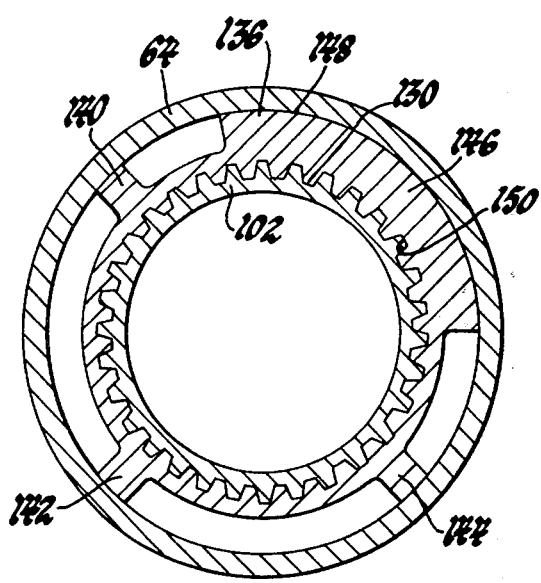
FIG. 4 is a sectional view taken along the line 4—4 of FIG. 3.
Figure 5:
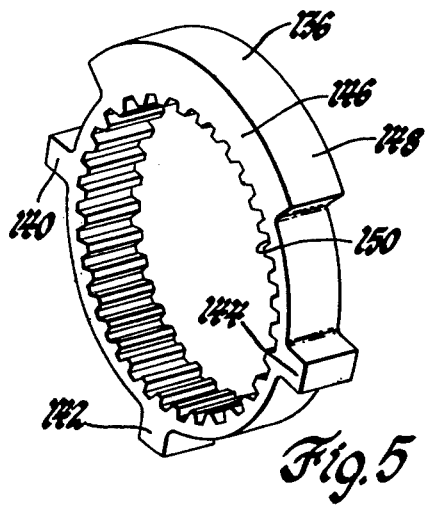
FIG. 5 is a perspective of a balance weight in FIG. 1.

The intermediate balance weight subassembly 112, which is more particularly set forth in FIGS. 3 and 4, includes a splined index land surface 130 thereon having an end shoulder 132 which is seated against one end of a first annular balance weight 134 arcuately indexed on surface 130. The subassembly further includes a second balance weight 136 arcuately indexed on the splined surface 130 angularly with respect to the balance tube 102 and a spanner nut 138 is threaded on an external thread portion 139 of the tube 102 to retain the weights 134, 136 axially against the shoulder 132 and against axial movement with respect to the balance tube 102. Each of the balance weights 134, 136 include a plurality of radially outwardly located circumferentially spaced tabs 140, 142, 144 thereon each having its outer tip press fit against the inside diameter of the tubular portion 64 and further includes an arcuate flange 146 thereon having its outer periphery 148 press fit within the inside diameter of the tubular portion 64 to further locate the balance tube 102 concentrically within the portion 64. As best seen in FIG. 4, each of the balance weights is angularly indexed with respect to the spline surface 130 on the tube 102 by a radially inwardly located spline surface 150 thereon so as to accurately position the flange 146 of the weight 134 with respect to the tube. Each of the aforedescribed balance weights 124, 126 in the front subassembly 110 are likewise configured for angular indexing with respect to the balance tube 102.

The rear weight subassembly 114 includes a pair of balance weights 151, 153 having a configuration like the previously described balance weights 134, 136 to be arcuately adjusted with respect to a spline index land surface 152 on the rear of the tube 102. A spanner nut 154 is threadably received on an external thread 156 on the shaft to secure the weights axially with respect to the tube 102. As in the case of the previously described balance weight sets, the annular balance weights 151, 153 have their outer periphery referenced, in this case, by the central bore 54 so as to locate the rear end of the tube 102 concentrically with respect to the tubular extension 64.

The assembly 100 can be removed by disconnecting the spanner nut 106 and the weights can be angularly indexed with respect to the splined reference surfaces thereon exteriorly of the engine and replaced quickly and easily within the free turbine shaft 66 with the space balance weights subassemblies 110, 112, 114 thereon serving to locate the balance tube 102 with its axis colinearly of the axis of the free turbine shaft 66 with the adjusted balance weights thereon serving to produce a multi-plane precision in-situ balance of the rotating mass portions of the turbine section of the engine 10 under super critical phases of operations.

Adjustment of the weights to produce such balance can be obtained without the requirement for special tooling and eliminates the need for machining away of any parts of the rotating mass of the engine.

While the embodiments of the present invention, as herein disclosed, constitute a preferred form, it is to be understood that other forms might be adopted.

What is claimed is:

1. A rotor balance assembly comprising: a drive shaft having a longitudinal axis and a mass thereon rotatable about said longitudinal axis, said drive shaft including an elongated tubular portion thereon having a first access opening thereto, a plurality of axially spaced reference surfaces on the interior of said tubular portion, each of said surfaces being formed continuously circumferentially of said interior, a balance tube located interiorly of said tubular portion in radially inwardly spaced relationship thereto, means for removably connecting one end of said balance tube to one end of said tubular portion, a plurality of axially spaced index splines on the outer periphery of said balance tube, an annular balance weight removably secured to each of said index splines against rotation with respect to said tube and arcuately adjustable through a plurality of circumferentially indexed positions when said balance tube is removed from said shaft, each of said balance weights having an outer peripheral surface engageable with said reference surfaces when the balance tube is inserted within said tubular portion of said shaft to align said tube concentrically within said shaft with its longitudinal axis colinear of the longitudinal axis of said shaft, said weights being configured to balance said shaft means and mass thereon in multple planes in-situ within said shaft.

2. A rotor balance assembly comprising: a drive shaft having a longitudinal axis and a mass thereon rotatable about said longitudinal axis, said drive shaft including an elongated tubular portion thereon having a first access opening thereto, a plurality of axially spaced reference surfaces on the interior of said tubular portion, a balance tube located interiorly of said tubular portion in radially inwardly spaced relationship thereto, means for removably connecting one end of said balance tube to one end of said tubular portion, means engageable with said reference surfaces when the balance tube is inserted within said tubular portion of said shaft to align said tube concentrically within said shaft with its longitudinal axis colinear of the longitudinal axis of said shaft, a plurality of axially spaced index splines on the outer periphery of said balance tube, an annular balance weight removably secured to each of said index splines against rotation with respect to said tube and arcuately adjustable through a plurality of circumferentially indexed positions when said balance tube is removed from said shaft, said weights being configured to balance said shaft means and mass thereon in multiple planes in-situ within said shaft.

* * * * *